Patented Aug. 29, 1944

2,356,740

UNITED STATES PATENT OFFICE 2,356,740

MORDANT DYESTUFFS AND A PROCESS FOR THEIR MANUFACTURE

Karl Glenz and Franz Neitzel, Basel, Switzerland, assignors to the Swiss firm of Durand & Huguenin, A. G., Basel, Switzerland No Drawing. Application April 21, 1942, Serial No. 439,944. In Germany March 19, 1941

7 Claims. (Cl. 260—438)

It has been found that by the reaction of a body of the general formula:

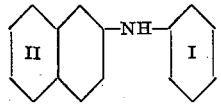

wherein the benzene nucleus I may bear substituents, particularly an OH- and a COOH-group in ortho-position to each other and the nucleus II of the naphthalene molecule contains advantageously solubilizing groups, particularly sulphogroups, with the nitroso compound of a body of the benzene series containing besides the nitrosogroup an OH- and a COOH-group in ortho-position to each other in a suitable solvent or diluting agent, in the presence of an acid, new useful dyestuffs can be obtained, which, if necessary, may further be sulphonated.

The starting material represented by the above mentioned formula can be obtained according to the process of U. S. Patent 2,048,283. A body obtained directly according to said process containing more than one molecule of amino salicylic acid, as well as the product obtained from this body by splitting off the loosely bound aminosalicylic acid, can be used.

The nitroso compounds of bodies of the benzene series, containing besides the nitroso group an OH- and a COOH-group in ortho-position to each other are produced for instance from salicylic acid, sodium nitrite and copper sulphate, see Chem. Centralblatt 1928. II, page 759 W. Gulinow. These nitroso compounds may be used in form of the metal compound referred to therein, particularly as copper compound.

It is remarkable that the condensation of one of the intermediary products mentioned above with a nitroso body in order to give the dyestuff can already be carried out, in some cases, at an ordinary temperature. In other instances, it is advisable to slightly warm up the reaction mass.

These dyestuffs are especially suitable for chrome printing and all of these dyestuffs are more or less resistant to reducing agents. Some of them are resistant to the said agents to such an extent that they are useful dyestuffs for coloured discharge printing and therefore a welcome enrichment of this field.

The dyestuffs obtained according to the process referred to above are particularly suitable for chrome printing on natural silk and viscose. Some of them give also interesting shades on cotton.

The present process may be illustrated by the following examples without being limited thereto. The parts are by weight unless otherwise stated.

*Example 1*

A body of the following formula:

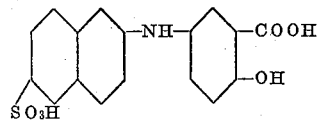

is brought to reaction with nitroso salicylic acid (copper-compound). 359 parts of the condensation product obtained from 2-hydroxynaphthalene-6-sulphonic acid and p-aminosalicylic acid and corresponding to the above stated formula (M. W. 359) are dissolved in 5000 parts of boiling alcohol. The mass is cooled down to 50° C. whilst stirring. 370 parts of nitroso salicylic acid (copper-compound) are added thereto, and, while further thoroughly stirring, one adds drop by drop at the same temperature in the course of one hour, 400 parts of hydrochloric acid of 30% strength. The mass turns to red-brown and all of the components are completely dissolved. After some time, the dyestuff precipitates out. Stirring is continued for a further few hours, and then the whole is cooled down. The dyestuff is filtered off and washed with some alcohol. In order to remove the copper salt the dyestuff is stirred for 2 hours with 2000 parts of hydrochloric acid of 10% strength and filtered again. The dyestuff is preferably dissolved in soda water, then filtered and precipitated from this solution as free dyestuff acid with diluted hydrochloric acid. Finally, the dyestuff is dissolved again in alkaline water, salted out, filtered, pressed and dried.

The new dyestuff is a red-brown powder, which gives red-violet shades when dissolved in water. The colouration of the solution in concentrated sulphuric acid is also red-violet and turns to yellow when water is added.

When printed on cotton with a chromium mordant, the dyestuff gives a red-brown, which resists against hydrosulphite discharge. It is, therefore, excellent for coloured discharge printing.

Instead of the naphthalene derivative used in this example, isomers thereof, i. e. the bodies which are derivatives of the 2-naphthol-5- respectively 7- or 8-sulphonic acid, may be used.

Instead of in ethyl alcohol, the condensation can be carried out in methyl alcohol, glacial acetic acid or in other similar solvents.

Example 2

A body of the following formula:

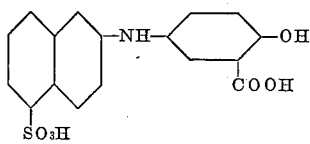

is condensed with nitroso-o-cresotinic acid (copper-compound). 512 parts of the condensation product (1 mol. 2-naphthylamine-5-sulphonic acid+2 mol. p-aminosalicyclic acid, M. W. 512) which is obtained directly from 2-naphthylamin-5-sulphonic acid and p-aminosalicylic acid, 2000 parts of methyl alcohol, 400 parts of nitroso-o-cresotinic acid (copper-compound) are mixed together thoroughly at room temperature. 500 parts of hydrochloric acid of 30% strength are added in one portion, whereby the temperature is caused to rise to approximately 50° C. The reaction mass turns rapidly to red-brown and solution takes place. After a short time, the dyestuff is precipitated out in form of crystals. Stirring is continued for a further few hours. Then the dyestuff is separated from the solution by sucking off and washed with some methyl alcohol. The product is then washed with diluted hydrochloric acid in order to remove the copper salt. The body is thereafter dissolved in soda water, filtered and again precipitated as free dyestuff acid with diluted hydrochloric acid. Finally, the dyestuff is again dissolved in water with the necessary quantity of sodium carbonate and salted out from this solution, separated by filtration, pressed and dried.

When dissolved in water, the solution shows a red-violet colouration. The colouration of the solution in concentrated sulphuric acid is also red-violet. On adding water thereto it turns to yellow. When printed with a chromium mordant on natural silk, the dystuff gives Bordeaux shades which resist very well against hydrosulphite.

The naphthalene body used in this example can be brought to reaction in the same way with nitroso-salicyclic acid or with nitroso-meta-cresotinic acid (copper-compound). In the first case, a dyestuff giving yellower shades is obtained, while in the second case there is produced a dyestuff giving bluer shades than the dyestuff obtained by means of nitroso-o-cresotinic acid. The other properties are quite similar to those of the latter product.

Example 3

A body of the following formula:

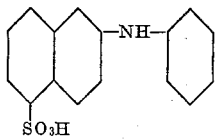

is condensed with nitroso-salicylic acid (copper-compound). For this purpose 299 parts of 2-phenylamino-naphthalene-5-sulphonic acid are dissolved while warm in 2500 parts of alcohol. The mass is warmed up to 50° C. Whilst well stirring, 370 parts of nitroso-salicylic acid (copper-compound) are added and, while further stirring, 400 parts of hydrochloric acid of 30% strength are slowly added drop by drop at this temperature within 2 hours.

After some time, a complete solution is obtained. One part of the alcohol is removed by distillation and the dyestuff thus formed is precipitated out to the greatest extent. Then the dyestuff is filtered off, washed with some alcohol and afterwards diluted hydrochloric acid is added thereto in order to remove the copper salt, whereupon the dyestuff is converted into its sodium salt in the same manner as described in the above examples.

The dyestuff thus obtained dissolves in water and in concentrated sulphuric acid with a red-violet colouration. The colouration of the latter solution turns to yellow when water is added. In chrome printing on natural silk, bluish Bordeaux is obtained.

A similar dyestuff with the same properties is obtained from 2-phenylaminonaphthalene-7-sulphonic acid. It gives in chrome printing on cotton red-brown shades which resist against discharge. 2-phenyl-naphthalene-sulphonic acids containing substituents in the phenyl nucleus can also be used. Such bodies are for instance 2-(orthotolyl)-aminonaphthalene-6-sulphonic acid, 2-(4'-chlorophenyl)-aminonaphthalene-6-sulphonic acid, 2-(3'-carboxyphenyl)-aminonaphthalene-7-sulphonic acid. Except for little differences, these dyestuffs are similar to the dyestuff made according to Example 3.

What we claim is:

1. The mordant dyestuff which is produced by the reaction, in an acid medium, between a compound of the formula

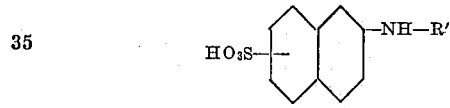

wherein R' represents a radical of the group consisting of phenyl, carboxyphenyl, methylphenyl and

and a member of the group consisting of the copper compounds of nitroso-salicylic acid and the nitroso-cresotinic acids.

2. The mordant dyestuff which is produced by the reaction, in an acid medium, between a compound of the formula

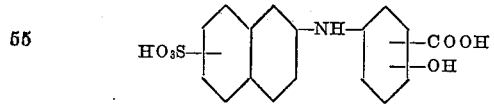

and a member of the group consisting of the copper compounds of nitroso-salicylic acid and the nitroso-cresotinic acids.

3. The mordant dyestuff which is produced by the reaction, in an acid medium, between a compound of the formula

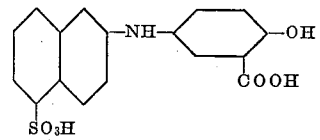

and a member of the group consisting of the copper compounds of nitroso-salicylic acid and the nitroso-cresotinic acids.

4. The mordant dyestuff which is produced by the reaction, in an acid medium, between a compound of the formula

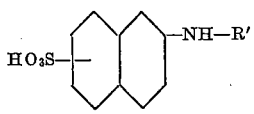

wherein R' represents a radical of the group consisting of phenyl, carboxyphenyl, methylphenyl and

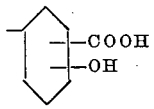

and the copper compound of nitroso-salicylic acid.

5. The mordant dyestuff which is produced by the reaction, in a reaction medium consisting of methyl alcohol acidified with hydrochloric acid, between the compound of the formula

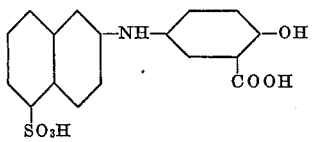

and the copper compound of nitroso-ortho-cresotinic acid.

6. The mordant dyestuff which is produced by the reaction, in a reaction medium consisting of ethyl alcohol acidified with hydrochloric acid, between the compound of the formula

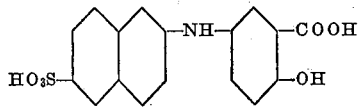

and the copper compound of nitroso-salicylic acid.

7. The mordant dyestuff which is produced by the reaction, in a reaction medium consisting of ethyl alcohol acidified with hydrochloric acid, between the compound of the formula

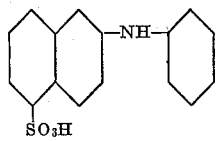

and the copper compound of nitroso-salicylic acid.

KARL GLENZ.
FRANZ NEITZEL.